United States Patent [19]

Yamamoto

[11] Patent Number: 4,988,158
[45] Date of Patent: Jan. 29, 1991

[54] IMAGE PICKUP HEAD FOR IMAGE PICKUP DEVICE

[75] Inventor: Masao Yamamoto, Tama, Japan

[73] Assignees: Mitsubishi Kasei Corporation; Scalar Corporation, both of Tokyo, Japan

[21] Appl. No.: 474,332

[22] Filed: Feb. 2, 1990

[30] Foreign Application Priority Data

Feb. 4, 1989 [JP] Japan .................................. 1-026462
Oct. 20, 1989 [JP] Japan .................................. 1-273419

[51] Int. Cl.$^5$ .............................................. G02B 6/32
[52] U.S. Cl. .................................................. 350/96.18
[58] Field of Search .................. 350/96.18, 96.20, 337, 350/331 R

[56] References Cited

U.S. PATENT DOCUMENTS 3,600,067 8/1971 Heine ................................ 350/96.26
4,763,993 8/1988 Vogeley et al. ................. 350/337 X
4,930,851 6/1990 Yamamoto ....................... 350/96.10

Primary Examiner—Akm Ullah
Attorney, Agent, or Firm—Oblon, Spivak, McClelland, Maier & Neustadt

[57] ABSTRACT

An image pickup head for an image pickup device capable of permitting the observed section at a subject to be illuminated with a uniform lumination while preventing the reflection of light at the observed section from adversely affecting an image of the observed section. A first polarizing element having a predetermined polarization plane is arranged in the optical path of light projected from the projection end of a light guide onto a subject, while a second polarizing element having a predetermined polarization plane is arranged in the optical path of light reflected at the subject and guided to an image pickup element. The polarization planes of the first and second polarizing elements are varied relative to each other to provide an image either including or free of light reflected at the surface of the subject.

7 Claims, 5 Drawing Sheets

IMAGE PICKUP HEAD FOR IMAGE PICKUP DEVICE

BACKGROUND OF THE INVENTION

1. Field of the Invention

This invention relates to an image pickup head for an image pickup device adapted to pick up an image of the surface of an object in various fields such as medical fields, industrial fields and the like.

2. Description of the Prior Art

Image pickup devices have been used in various fields which are adapted to abut a surface to be imaged such devices have an image pickup head including built-in light projecting means for illuminating the surface of a section to be observed (hereinafter referred to as an "observed section") of a subject or an object in order to display a magnified image of the surface of the observed section at a monitor image plane. In such image pickup devices, it is essential that illumination of the surface of the observed section is appropriately and accurately carried out.

More particularly, illumination, mainly comprising light, which is vertically projected onto the surface of the observed section of an object against which the image pickup head abuts (hereinafter referred to as "abutment surface") tends to cause the reflection of the light at the abutment surface of the subject to be increased. This results in the image of that portion of the abutment surface at which the reflection of light is increased to appear white on a monitor image plane provided for displaying a magnified image of the abutment surface. This leads to a failure in the satisfactory observation of details of the abutment surface of the object, such as its color, its overall configuration and the like.

Illumination mainly using horizontally projected light, i.e. light which is projected parallel to the abutment surface of the observed section of a subject generally fails to satisfactorily illuminate fine recesses which might exist on the abutment surface. Thus, a finely recessed portion of the abutment surface would appear relatively dark on a monitor image plane for displaying a magnified image of the abutment surface, resulting in an inability to observe fine details in the abutment surface of the subject.

In order to alleviate these problems, the present applicants proposed a light guiding device for illumination suitable for displaying a magnified image of the observed surface of a subject including fine recesses, as disclosed in U.S. patent application Ser. No. 07/362,658 now U.S. Pat. No. 4,930,851.

The proposed light guiding device is adapted to be used with an image pickup head and is constructed so as to eliminate the adverse effect of light reflected on the surface of the observed section of a subject, to permit a three-dimensional magnified image of the surface to be satisfactorily displayed on a monitor image plane. Unfortunately, elimination of light reflected on the observed surface renders the observation of light reflection on the surface substantially impossible.

The forgoing observations will now be considered in connection with the observation of the surface of the skin of the human body. The so-called "shining condition" of the skin such as the complexion and glow of the surface of the skin vary depending upon the health condition of the skin, the degree of aging of the skin and so on. Therefore, the "shining conditions" of the skin are useful in determining the condition of the skin. The detection of the shining condition of the skin for this purpose can be carried out on the basis of the degree of reflection of light at the skin surface. Thus, although it is generally effective and desirable to eliminate the reflection of light at the surface of the observed section of an object in order to observe the object accurately, it is also desirable to detect of light reflected at the surface of the observed section possible.

Furthermore, the image obtained of the observed section of an object, when accompanied by light reflected at the observed section, satisfactorily shows the three-dimensional or stereo configuration of the observed section, whereas the image of the observed section which is free of reflected light effectively indicates the color of the observed section. In the latter case, for example, when the observed section is the skin of a human body, a part of light projected onto the skin penetrates the outer layer of the skin, thereby causing the structure of the outer layer to be clearly observed.

Accordingly, the present applicants have concluded that the substantially simultaneous observation of both an image of the object accompanied by light reflected at the surface of the observed section and an image thereof free of reflected light significantly contributes to the detecting of or observation of cells in which a cancer may have developed, and the like.

SUMMARY OF THE INVENTION

The present invention has been made in view of the foregoing disadvantage of the prior art.

Accordingly, it is an object of the present invention to provide an image pickup head for an image pickup device which is capable of permitting the observed section of an object to be illuminated with as uniform an illuminance as possible.

It is another object of the present invention to provide an image pickup head for an image pickup device which is capable of permitting a magnified image of the observed section of an object to be effectively displayed while preventing the reflection of light at the observed section from adversely affecting the image, as well as permitting the degree of the light reflection to be detected.

It is a further object of the present invention to provide an image pickup head for an image pickup device which is capable of permitting an image of the observed section of an object accompanied by light reflected at the surface of the observed section, and an image of the same observed section free of the reflected light, to be selectively displayed while being instantaneously changed over as required.

In accordance with the present invention, there is provided an image pickup head for an image pickup device comprising: a head body; an optical system within the head body; an image pickup element in the head body arranged to pick up an optical image introduced through the optical system; and a light guide located annularly about the optical axis of the optical system in the head body arranged to project light for illumination, supplied from a light source, through the projection end of the light guide on to the surface of a subject; a first polarizing element having a predetermined polarization plane, arranged in the optical path of light projected from the projection end of the light guide onto the subject; a second polarizing element having a predetermined polarization plane, arranged on the optical path of light reflected at the subject and guided to the image pickup element; and operative means for varying the polarization planes of first and second polarizing element relative to each other.

In a preferred embodiment of the present invention, the operation means comprises rotation means for rotating any one of the first and second polarizing elements about the optical axis of the optical system to vary their polarization planes relative to each other.

Alternatively, the operation means may comprise a slide system for causing at least one second polarizing plate, having a predetermined polarization plane crossing the polarization plane of a first polarizing plate, to enter retractably the optical path of the reflected light.

In an alternative embodiment of the present invention, the second polarizing element has a predetermined polarization plane crossing the polarization plane of the first polarizing element and is arranged in the optical path of light reflected at the object and guided to the image pickup element, and a rotation element is provided on the side of the first or second polarizing element facing the object arranged to rotate the polarization plane of one of the first and second polarizing elements relative to the polarization plane of the other polarizing element.

In a preferred embodiment of the present invention, the rotation element comprises a liquid crystal element. Alternatively, the rotation element may comprise a PLZT.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein.

DETAILED DESCRIPTION OF THE PREFERRED EMBODIMENT

Now, an image pickup head for an image pickup device according to the present invention will be described in detail hereinafter with reference to the accompanying drawings.

Figure 1:
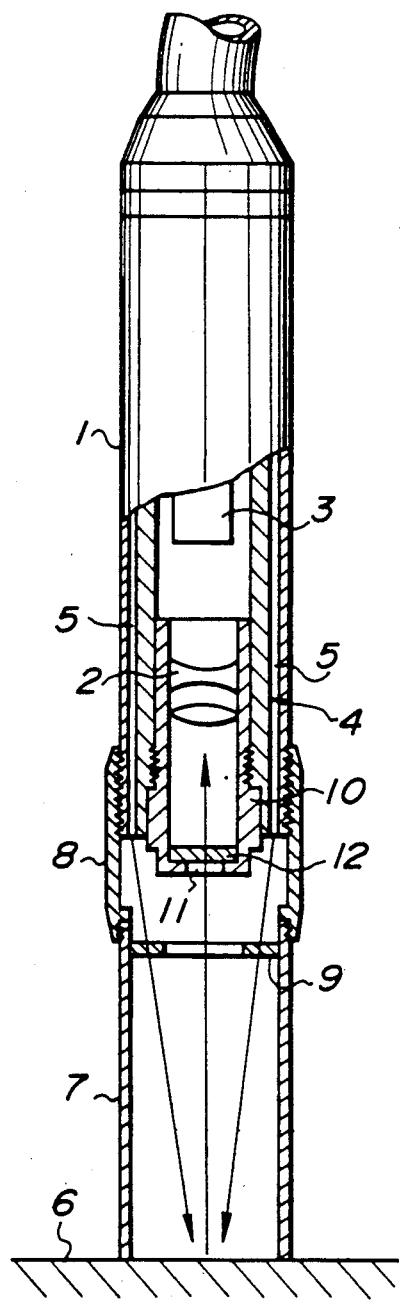
FIG. 1 is a schematic front elevation, partly in section, showing a first embodiment of an image pickup head for an image pickup device according to the present invention.

FIG. 1 shows a first embodiment of an image pickup head for an image pickup device according to the present invention. The pickup head includes a head body comprising a lens barrel or tube 1, in which a magnifying optical system 2 is located. The lens tube 1 also houses an image pickup element of CCD image sensor 3 for converting an optical image formed through the magnifying optical system 2 into an electrical signal. For this purpose, the image pickup element 3 is positioned at the proximal end of the lens tube 1 and is connected to a display unit (not shown) including a monitor image plane for displaying a magnified image obtained through the image pickup element 3.

The image pickup head also includes a plurality of optical fibers 5 on the inner surface of the lens tube 1 located about the optical axis of the magnifying optical system 2 so as to form a part of the lens tube 1. The optical fibers 5 are annularly arranged in a manner to surround the magnifying optical system 2 and be close to one another, thus forming a light guide 4. The light guide 4 is so arranged that its distal end terminates at the distal end of the lens tube 1. The optical fibers 5 are bundled in front of a light source (not shown) and then guided to the proximal end of the lens tube 1. Then, the optical fibers 5 extend toward the distal end of the lens tube 1 while being evenly arranged in such a way that they are annularly close to one another. Such an arrangement of the light guide 4 permits light projected from the light guide 4 onto the surface of the observed section of a subject or object 6 to illuminate the surface uniformly.

The image pickup head also includes an objective contact member 7 of a cylindrical configuration which is threadedly connected to the distal end of the lens tube 1 through a cylindrical member or ring 8 which is itself threadedly connected to the lens tube 1. The axial position can then be varied for the adjustment of focus of the head. The objective contact member 7 extends in the direction of the optical axis of the magnifying optical system 2 and engages the ring 8 about the optical axis of the magnifying optical system 2. The objective contact member 7 has an opening at its distal end, which is brought into contact with the surface of the observed section of the subject 6 to stabilize the positional relationship between the lens tube 1 and the surface of the observed section of the subject 6 with this arrangement, the objective contact cylinder 7 can be rotated relative to the lens tube 1, resulting in the focus of the lens tube 1 or magnifying optical system 2 and therefore the image pickup head being adjusted.

In the illustrated embodiment, the objective contact member 7 has a cylindrical shape. However, it may be formed into any other suitable shape depending upon the properties of the surface of the observed section of the subject 6. For example, it may be expanded or constricted at its distal end.

The image pickup head further includes a first polarizing element or plate 9 having an annular shape located in the objective contact member 7. The first polarizing plate 9 is positioned in the optical path of light discharged from the distal end or projection end of the light guide 4 towards the surface of the observed section of the subject 6, so that light from this distal end of the light guide 4 passes through the first polarizing plate 9 for illuminating the surface of the subject 6. The image pickup head also includes a second polarizing element or plate 12 of a circular shape positioned in the optical path of light reflected at the observed section of the subject 6 and directed toward the image pickup element 3. In the illustrated embodiment, the second polarizing plate 12 is located inside an opening 11 in a mounting cylinder 10 in which the magnifying optical system 2 is housed.

The operation of the image pickup head of the first embodiment will now be described.

First, for the purpose of observing the subject 6, the objective contact member 7 is placed in contact with the surface of the observed section of the subject 6 and then rotated to cause movement in the axial direction, resulting in adjustment of the focus of the image pickup head.

Light for illumination is radiated from the light source (not shown) and is annularly uniformly discharged from the optical fibers 5 constituting the light guide 4 and permeates through the first polarizing plate 9, positioned in the optical path of the light, so that the light is linearly polarized. This results in the light illuminating the abutment surface or the observed surface of the subject 6 with a substantially uniform illumination. Thus, it will be noted that the image pickup head of the illustrated embodiment may accomplish satisfactory illumination on the abutment surface of the subject 6 even when any unevenness exists on the abutment surface.

Light reflected at the abutment surface of the observed section of the subject 6 is linearly or straightly polarized light having been polarized by the first polarizing plate 9, and has a polarization plane in a specific vector direction. Also, the portion of the polarized light reaching the interior of the subject through the abutment surface is reflected within the interior after being changed, at the abutment surface, into circularly polarized light having a polarization plane in every direction corresponding to the configuration of the abutment surface. Thus, the linearly polarized light reflected on the abutment surface and the circularly polarized light reflected within the interior of the subject 6 are guided together to the second polarizing plate 12, which either allows only the linearly polarized light to permeate through or removes it, so that either only the linearly polarized light or only the circularly polarized light may be selectively guided through the magnifying optical system 2 to the image pickup element 3. This results in a magnified image of the abutment surface being supplied to the image pickup element 3.

Thus, in this first embodiment, turning the objective contact member 7 causes the first polarizing plate 9 and second polarizing plate 12 to be rotated relative to each other, leading to a deviation between the polarization planes of the two polarizing plates. Adjustment of the relative angle between the polarizing plates 9 and 12 may readily selectively provide an output for the image pickup element 3 which is either accompanied by, or free of, light reflected at the abutment surface of the subject 6.

The elimination of light reflected at the abutment surface from the output permits the color at the abutment surface of the observed section to be observed highly distinctly. When, for example, the skin of a human body is to be observed, this permits the conditions of the skin such as the conditions of capillary vessels, the rubescence of the skin, the precipitation of a pigment in the skin, a change to the morbid state and the like to be readily diagnosed. Furthermore, when it is required to detect the degree or amount of light reflected at the abutment surface for the purpose of observing, for example, the "shining condition" of the skin as described above, a comparison between the output for the image pickup element free of light reflected at the abutment surface and that accompanied by the light, which are obtained by rotating the first and second polarizing plates 9 and 12 relative to each other, can be carried out, resulting in the quantitative detection of the "shining condition" being facilitated.

Thus, the image pickup head of the first embodiment permits a magnified image of the abutment surface of the subject 6 to be distinctly formed at the light receiving plane of the image pickup element 3, and is then displayed on the image plane of a monitor display device such as a TV monitor. The image pickup head is suitable not only for a magnifying observation of the tissues of the skin or an organ of a human body but also the observation of various kinds of subjects, by constructing the objective contact member appropriately to each of the subjects.

In this first embodiment, relative rotation between the first polarizing plate 9 and the second polarizing plate 12 is carried out manually. However, the present invention may be constructed so as to carry out his relative rotation automatically.

Figure 2:
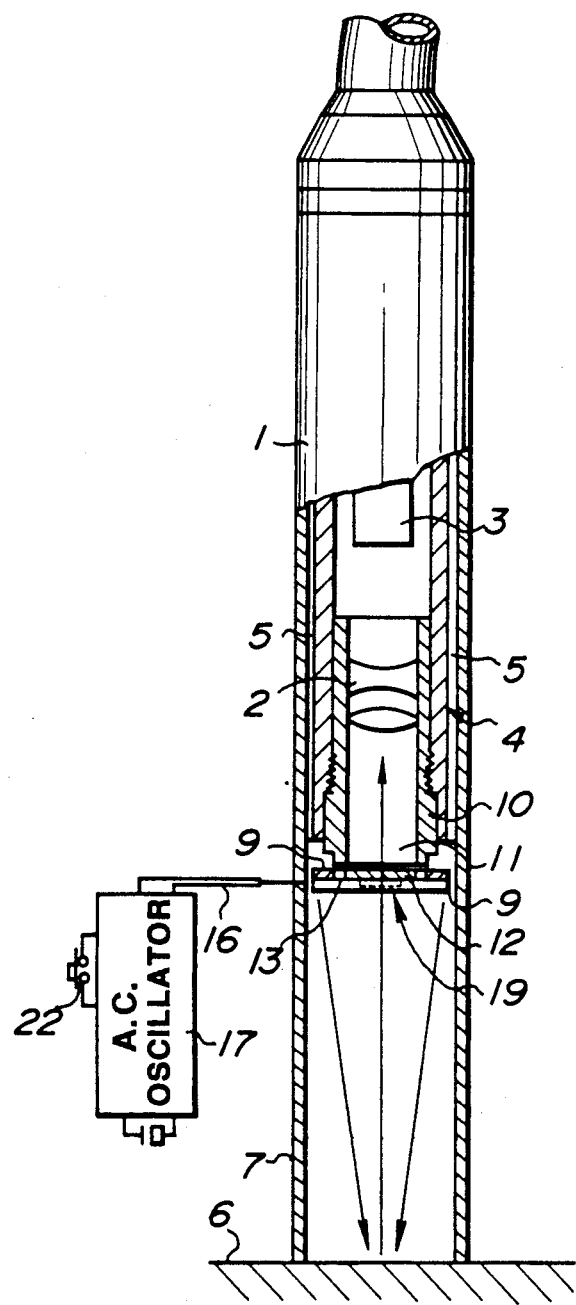
FIG. 2 is a view similar to FIG. 1 showing a second embodiment.
Figure 4:
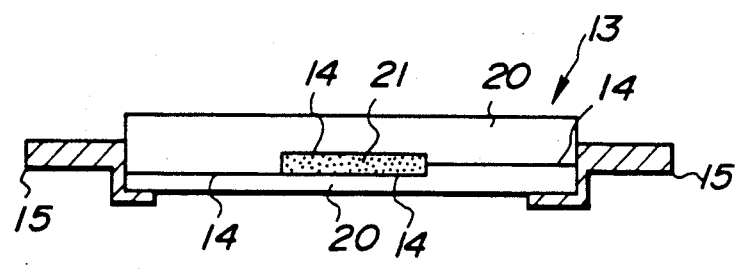
FIG. 4 is a schematic sectional view of the liquid crystal element shown in FIG. 3(a)

FIGS. 2 and 4 show a second embodiment of an image pickup head according to the present invention, which is adapted to carry out relative rotation between the two polarizing plates automatically and rapidly.

The image pickup head of the second embodiment includes a head body comprising a lens barrel or tube 1, in which a magnifying optical system 2 is housed, as in the first embodiment. Also, the lens tube 1 has an image pickup element 3 for converting an optical image formed through the magnifying optical system 2 into an electrical signal. For this purpose, the image pickup element 3 is located at the proximal end of the lens tube 1 and connected to a monitor display unit such as a TV monitor (not shown) including an image plane for displaying the magnified image obtained through the image pickup element 3.

The image pickup head also includes a plurality of optical fibers 5 on the inner surface of the lens tube 1 arranged about the optical axis of the magnifying optical system 2. The optical fibers 5 are annularly arranged in a manner to be close to one another and surrounded the magnifying optical system 2, thus forming a light guide 4. The light guide 4 is so arranged that its distal end terminates at the distal end of the lens tube 1. The optical fibers 5 are bundled in front of a light source (not shown) and then guided to the proximal end of the lens tube 1. Then, the optical fibers 5 extend toward the distal end of the lens tube 1 while being evenly arranged in such a way that they are annularly close to one another. Such an arrangement of the light guide 4 permits discharged from the light guide 4 to illuminate uniformly the surface of the observed section of a subject 6.

The lens tube 1 is so formed that its distal end protrudes by an amount required for the adjustment of the focus of the image pickup head, resulting in the provision of an objective contact member 7 of cylindrical shape which extends in the direction of the optical axis of the magnifying optical system 2. The objective contact member 7 has at its distal end an opening, which is brought into contact with the surface of the observed section of the subject 6 to stabilize the positional relationship between the lens tube 1 and the subject 6. Also, the objective contact member serves to block any foreign or external light from entering the image pickup head.

In this embodiment, the objective contact member 7, as described above, is connected directly to the lens tube 1. However, it may be connected to the distal end of the lens tube 1 through a cylindrical member or ring 8 adapted to be threadedly adjusted for the adjustment of focus of the lens tube as in the first embodiment. In the second embodiment, the objective contact member 7 has a cylindrical shape as in the first embodiment. However, it may be formed into any other suitable shape depending upon the properties of the abutment surface of the observed section of the subject.

For example, it may be expanded or constricted at its distal end.

In the second embodiment, as shown in FIGS. 2 to 4, a first polarizing plate 9 is provided, contiguous with an opening 11 in a mounting cylinder 10 for the magnifying optical system 2. The first polarizing plate 9 is annular and arranged coaxially with the optical axis of the magnifying optical system. It is positioned in the optical path of light for illumination discharged from the distal end or projection end of the light guide toward the subject, so that the light discharged from the light guide 4 may be projected on the abutment surface of the observed section of the subject. Also, a second polarizing plate 12 which is circular and has a polarization plane crossing that of the first polarizing plate 9, is arranged so as to be combined with the first polarizing plate 9 and received in the central opening of the first polarizing plate 9. The second polarizing plate 12 is positioned in the optical path of light reflected from the subject 6. On the subject side of the combination of the first and second polarizing plates 9 and 12, there is a liquid crystal element 13 which is contiguous with the second polarizing plate 12 so that it serves as a rotation element for rotating the polarization plane of the polarizing element or plate. An A.C. oscillator 17 is connected to the liquid crystal element 13 for applying a D.C. voltage to control the rotation of the polarization plane across a liquid crystal material (described below) through transparent electrodes 14, external electrodes 15 (FIG. 4) and through a lead wire 16 (FIG. 2). The oscillator 17 will be described below.

Figure 3A:
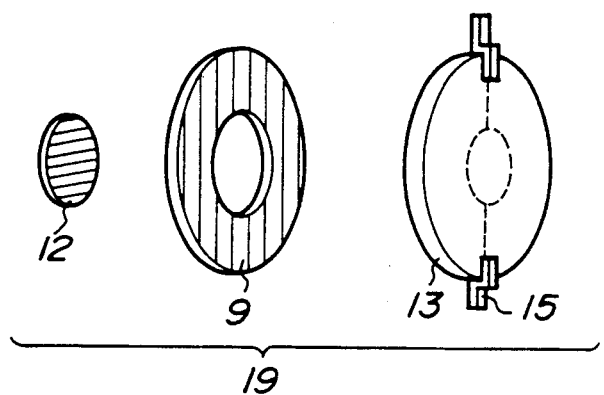
FIG. 3(a) is an exploded perspective view showing a polarization panel comprising a combination of polarizing plates and a liquid crystal element.
Figure 3B:
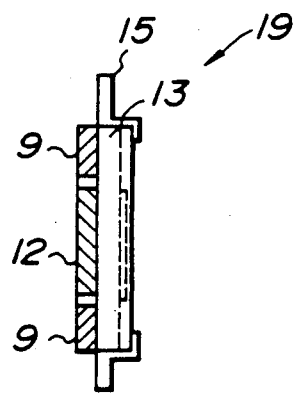
FIG. 3(b) is a sectional view of the polarization panel shown in FIG. 3(a)
Figure 3C:
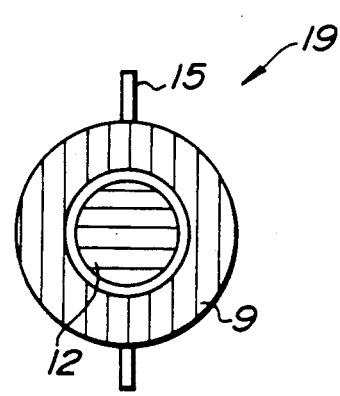
FIG. 3(c) is a front elevation of the polarization panel shown in FIG. 3(a)

The combination of the first and second polarizing plates 9 and 12 cooperates with the liquid crystal element 13 to constitute a polarization panel 19 as shown in detail in FIGS. 3(a) to 3(c). More specifically, FIG. 3(a) is an exploded perspective view showing the polarization panel 19 prior to assembly, FIG. 3(b) is a vertical sectional view of the panel 19 after assembly, and FIG. 3(c) is a front elevation of the panel 19 after assembly, viewed from the polarization plate side.

The liquid crystal element 13, as shown in FIG. 4, includes two transparent plates 20 made of a glass material or the like and a nematic liquid crystal material 21 interposed between the transparent plates 20. The transparent electrodes 14 are arranged on each surface of the liquid crystal 21 and are made of tin oxide, indium oxide or the like. The transparent electrodes 14 are connected to the corresponding external electrodes 15, respectively, which are then connected through the lead wire 16 to the A.C. oscillator 17 (FIG. 2). The oscillator 17 is connected to a control switch 22, which allows A.C. power to be supplied from the A.C. oscillator 17 to the transparent electrodes 14 to apply an A.C. voltage across the liquid crystal 21, whereby the liquid crystal element 13 readily controls rotation of the polarization plane of the second polarizing plate 12 in a vector direction. In addition, the control of the applied voltage facilitates adjustment of rotation angle of the polarization plane. It is also possible to pass an A.C. current between the transparent electrodes 14 in a manner to cause the phases to be opposite to each other, thereby rendering the average value of the voltage applied across the liquid crystal 21 zero. This tends to prolong the life of the liquid crystal 21.

In the illustrated embodiment, it is not necessarily required to arranged the A.C. oscillator 17 and control switch 22 directly on the image pickup head. They may be connected through the lead wire 16 to the image pickup head. In this instance, they may be operated by remote control. The oscillation frequency of the A.C. oscillator 17 is conveniently set within the range between 300 Hz and 50 Hz. When the oscillation frequency is set at a level as low as 60 Hz which is the output frequency of the monitor TV, the image displayed on the TV monitor is accompanied by a beat. The setting of the frequency at a level above 50 Hz does not exhibit any meritorious effect and rather causes an increase in power consumption. Thus, the frequency is preferably set at about 1 KHz. This is preferable also from the viewpoint of the manufacturing of the oscillator 17, because an oscillator of such a frequency is relatively easily manufactured.

The image pickup head may be constructed into any desired size depending upon its intended use, because the liquid crystal element 13 can readily be small-sized.

In place of the liquid crystal 21, there may be substituted a material capable of rotating the polarization plane of the polarizing plate by an electrical treatment such as, for example, PLZT. More specifically, the PLZT comprising a composite material of oxides of lead (Pb), lanthanum (La), zirconium (Zr) and titanium (Ti) and is a transparent crystal made by sintering the oxides in powder form under pressure. The polarization characteristics of PLZT vary when it is subject to electrical treatment. Alternatively, a material which is capable of rotating the polarization plane of the polarizing plate when magnetism is applied to it may be used for this purpose in place of the liquid crystal 21.

The remainder of the second embodiment may be constructed in substantially the same manner as the first embodiment.

The image pickup head of the second embodiment may be operated in substantially the same way as the first embodiment, in order to check the observed section of a subject 6. For this purpose, the object contact member 7 is placed against the surface of the observed section.

Then, light for illumination generated from a light source (not shown) is discharged through the optical fibers 5 of the light guide 4 from the periphery of the magnifying optical system 2. Thereafter, the light passes through the first polarizing plate 9 positioned in the optical path of the light, so that it may be subject to linear polarization, resulting in its having a polarization plane in a specific vector direction. This polarized light is uniformly projected on the abutment surface of the observed section of the subject 6 for illumination. This causes the light to be reflected at the abutment surface of the subject. This reflected light, as described above, is linearly polarized light with a polarization plane in a specific vector direction due to its polarization through the polarizing plate 9. A part of the polarized light reaches the interior of the subject 6 through the abutment surface and is reflected within the interior. It is therefore changed, at the abutment surface, into circularly polarized light, having a polarization plane in every direction corresponding to the configuration of the abutment surface. The linearly polarized light reflected at the abutment surface and the circularly polarized light reflected within the interior of the subject 6 are guided to the liquid crystal element 13. If no voltage is applied from the oscillator 17, the liquid crystal element 13 causes the direction of the polarization plane of the reflected light to be rotated by a predetermined angle, so that only reflected light having a polarization plane in the same vector direction as the linearly polarized and reflected light may be permitted to permeate through the second polarizing plate 12 and reach the image pickup head 3 through the magnifying optical system 2.

On the other hand, when a voltage is applied from the oscillator 17, the polarization direction of the reflected light is not caused to be rotated. Accordingly, the reflected light permeates through the liquid crystal element 13 while leaving the polarization direction of the linearly polarized light as it is without changing the vector direction, so that the reflected light fails to permeate through the second polarizing plate 12. Thus, only that portion of the light reflected within the interior of the subject, from which the light reflected at the abutment surface of the subject which has a polarization plane in the vector direction is removed, permeates through the second polarizing plate 12 and is guided through the magnifying optical system 2 to the image pickup element 3.

Thus, it will be noted that the image pickup head of the second embodiment selectively provides either an output for the image pickup element which contains light reflected at the abutment surface of the subject 6, or an output for the image pickup element from which only the reflected light is removed, as required. Also, the illustrated embodiment permits the selection to be instantaneously carried out by the on-off control of the oscillator 17. Accordingly, it eliminates any necessity to keep subject 6 stationary, so that an image of the abutment surface accompanied by the light reflected at the surface and that free of the reflected light may be substantially concurrently observed. This permits the image pickup head to be operated in association with a device in which an electrical image is taken such as, for example, an image processing device, an image recording device or the like, so that an image of the observed section of the subject 6 accompanied by the reflected light and that free of the reflected light may be substantially simultaneously obtained with a time difference as small as ten milliseconds.

In this instance, although the output for the image pickup element which is accompanied by light reflected at the abutment surface of the observed section of the subject 6 facilitates the observation of unevenness of the surface, it fails to permit the color of the surface or the like to be distinctly observed. However, the application of a voltage across the liquid crystal element 13 causes light reflected at the surface of the observed section to be eliminated from the image, resulting in the color of the surface being distinctly observed to a degree sufficient to ensure accurate observation of the subject.

In the second embodiment, the arrangement of the first and second polarizing plates 9 and 12 may be carried out in any desired manner as long as the first polarizing plate 9 is positioned in the optical path of the projected light and the second polarizing plate 12 is positioned in the optical path of the reflected light.

Figure 5A:
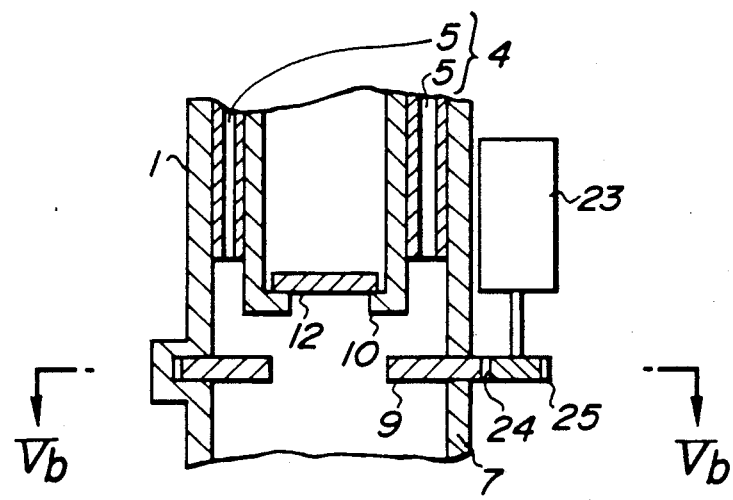
FIG. 5(a) is a fragmentary schematic vertical sectional view showing the essential part of third embodiment of an image pickup head for an image pickup device.
Figure 5B:
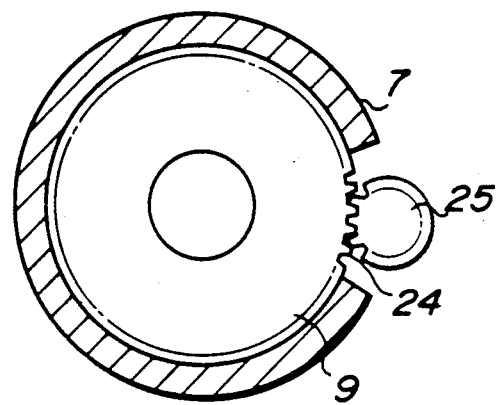
FIG. 5(b) is a sectional view taken along line Vb—Vb of FIG. 5(a)

FIGS. 5(a) and 5(b) show a third embodiment of an image pickup head according to the present invention. It is constructed so as to eliminate light reflected at the surface of the observed section of a subject without using a liquid crystal element as in the second embodiment.

In the third embodiment, as shown in FIGS. 5(a) and 5(b), a first annular polarizing plate 9 positioned in the optical path of projected light is pivotally supported on a cylindrical objective contact member 7 so as to be pivotally movable about the optical axis of the image pickup head. The objective contact member 7 is formed on the outer periphery with gearing 24, of which a part is exposed. The gearing 24 is operatively connected through a pinion 25 to a motor 23 outside the lens tube 1, by means of which it can be rotated. A second polarizing plate 12 provided in the optical path of reflected light is fixed in an opening 11 of a mounting cylinder 10. The remainder of the third embodiment may be constructed in substantially the same manner as the first embodiment.

In the image pickup head of the third embodiment, light for illumination generated or radiated from a light source (not shown) is guided through a light guide 4 to the first polarizing plate 9, where it is linearly polarized. When the first polarizing plate 9 is rotated by means of the motor 23, the vector direction of the polarization plane of the light, which is linearly polarized and then guided to the abutment surface of the observed section, varied with time as the first polarizing plate 9 rotates. The linearly polarized light with a varying vector direction is reflected at the abutment surface and circularly polarized light is reflected within the interior of the subject, are guided to the second polarizing plate 12.

The second polarizing plate 12 causes only that portion of the circularly polarized light reflected within the subject which has a polarization plane in a specific direction to pass through. It also ensures that only that portion of the linearly polarized light reflected at the surface of the subject which has the specific appropriate vector component will pass through.

Thus, it will be noted that the image pickup head of the third embodiment permits the proportion of light reflected at the abutment surface of the subject which represents the reflected light introduced to the image pickup element to be reduced, thus providing an image in which the light reflected at the surface of the observed section of the subject is decreased.

Figure 6A:
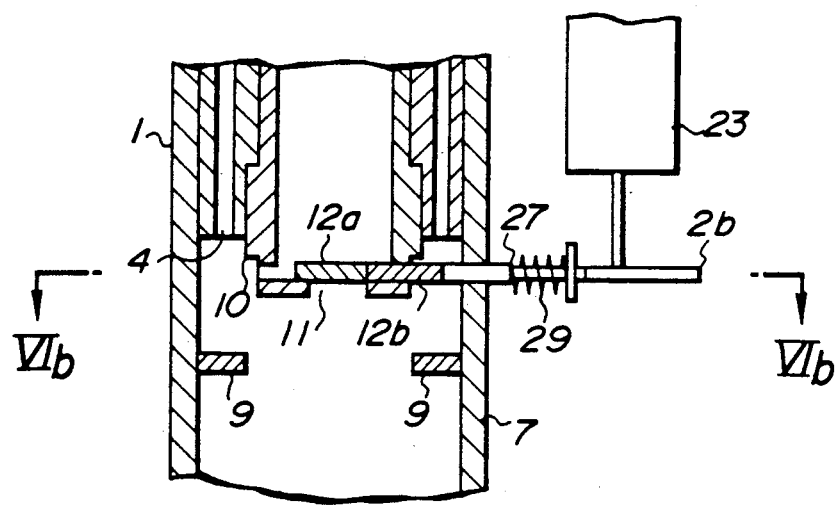
FIG. 6(a) is a fragmentary schematic vertical sectional view showing the essential part of a fourth embodiment of an image pickup head for an image pickup device.
Figure 6B:
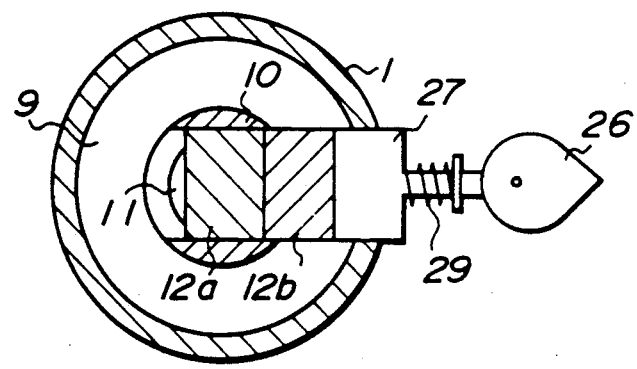
FIG. 6(b) is a sectional view taken along line VIb—VIb of FIG. 5(a).

FIGS. 6(a) and 6(b) show a fourth embodiment of an image pickup head according to the present invention, which is adapted to eliminate light reflected at the surface of the observed section of a subject 6 without using a liquid crystal element as used in the second embodiment.

In the fourth embodiment, a first annular polarizing plate 9 located in the optical path of the projected light is fixed on a cylindrical objective contact member 7 so that its center is aligned with the optical axis of the image pickup head, while a second polarizing plate 12 placed in the optical path of the reflected right is supported in the opening 11 of a mounting cylinder 10. It covers the opening 11 and is slidable in a direction perpendicular to the optical axis. The second polarizing plate 12 comprises a combination of a polarizing plate section 12a and a transparent polarizing plate section 12b. The polarizing section 12a allows linearly polarized light in a direction at an angle to the linearly polarized light passing through the first polarizing plate 9 to pass, while the transparent polarizing plate section 12b allows linearly polarized light in the same direction as the linearly polarized light passing through the first polarizing plate 9 to pass, or is free of any polarization properties. This second polarizing plate 12 has on one side a slide member 27, which is arranged so as to project or extend outside the objective contact member 7. It is constantly elastically abutted against a cam 26 driven through a motor 23 located outside a lens tube 1 by means of a spring 29. In this embodiment, the use of the transparent polarizing plate section 12b permits the difference in brightness between an image accompanied by reflected light and one free of reflected light to be significantly reduced.

The remainder of the fourth embodiment is substantially the same as the first embodiment.

In the image pickup head of the fourth embodiment, light for illumination radiated from a light source (not shown) is guided through a light guide 4 to the first polarizing plate 9, where it is linearly polarized. When the motor 23 is driven, the sections 12a and 12b of the second polarizing plate 12 are reciprocated in a plane perpendicular to the optical path of the reflected light, so that the polarizing plate sections 12a and 12b enter the optical path alternately.

Such an arrangement causes the ratio of permeation of the linearly polarized light through the polarizing plate 9 and then reflected at the surface of the observed section of the subject 6 to be decreased, so that reflected light from which a significant proportion of the light reflected at the abutment surface of the subject is removed may be introduced to the image pickup element, resulting in an image being obtained in which the light reflected on the abutment surface is greatly reduced.

Each of the image pickup heads of the present invention described above permits an image of a desired magnification to be obtained, determined by the magnifying optical system selected. It has been found that all the above-described embodiments allow the image to be magnified fifty to two hundred times.

As can be seen, an image pickup head in accordance with the present invention selectively provides an output for the image pickup element, either accompanied by light reflected at the surface of the observed section of a subject, or substantially decreased in or free from such reflected light. Also, the image pickup head of the present invention permits the outputs to be instantaneously changed. Thus, the present invention eliminates any necessity to keep a subject stationary, resulting in the possibility of an image of the subject accompanied by light reflected at the surface of the subject and an image decreased in or free of such reflected light being substantially simultaneously observed.

Furthermore, the output for the image pickup element accompanied by light reflected at the surface of the observed section of the subject can provide an image of the surface which readily enables the observation of any unevenness of the surface, whereas the output for the image pickup element decreased in reflected light permits the color of the surface of the subject to be distinctly and accurately observed. Thus, the image pickup head of the present invention allows, for example, the conditions of the skin, hair, capillary vessels of a human body, the rubescence of the skin, the precipitation of any pigment in the skin, a change to the morbid state and the like, to be readily diagnosed. In particular, the present invention permits the observed section of a subject to be directly visually observed, so that the diagnosis of pigment precipitation in the skin, the diagnosis of a grey hair, the inspection of dandruff and the like may be quantitatively carried out. Additionally, the image pickup head of the present invention is widely applicable to the inspection of fine cracks or unevenness in the surface of products in various industrial fields, for quality control of the product and the like.

What is claimed as new and desired to be secured by Letters Patent of the United States is:

1. An image pickup head for an image pickup device comprising:
   a lens tube;
   an optical system within said lens tube, said optical system having an optical axis;
   an image pickup element in said lens tube arranged to pick up an optical image introduced through said optical system;
   a light guide for guiding light from a light source to a projection end of said light guide spaced from the light source, said projection end of said light guide being located annularly about the optical axis of said optical system in said lens tube so that light is annularly projected from said projection end to uniformly illuminated a surface;
   a first polarizing element having a predetermined polarization plane, arranged in an optical path of light projected from said projection end of said light guide onto said surface;
   a second polarization element having a predetermined polarization plane, arranged on an optical path of light reflected at said surface and introduced through said optical system to said image pickup element; and
   operative means for varying the polarization planes of said first and second elements relative to each to permit one of the passage of reflected light from the surface to the image pickup element and elimination of reflected light from the surface to the image pickup element.

2. An image pickup head as defined in claim 1, wherein said operative means comprises rotation means for rotating one of said polarizing elements about said optical axis to vary said polarization plane relationship.

3. An image pickup head as defined in claim 1, wherein said operative means comprises a slide system arranged to cause at least one second polarizing plate having a determined polarization plane crossing the polarization plane of the first polarizing plate to enter said optical path of the reflected light retractably.

4. An image pickup head as defined in claim 1, wherein said second polarizing plate comprises a polarizing plate section and transparing polarizing plate section which are alternately brought into the path of the reflected light by said slide system.

5. An image pickup head as defined in claim 1, further comprising a rotation element located on the side of the first or second polarizing element facing the subject so as to rotate the polarizing plane of one of the polarizing elements in relation to the polarizing plane of one other polarizing element.

6. An image pickup head as desired in claim 5, wherein said rotation element comprises a liquid crystal element.

7. An image pickup head as defined in claim 6, wherein said rotation element comprises a PLZT.

* * * * *